US012694898B2

(12) United States Patent
Ee et al.

(10) Patent No.: US 12,694,898 B2
(45) Date of Patent: Jul. 28, 2026

(54) DISK DRIVE SUSPENSION ASSEMBLY WITH SINGLE ACTUATOR

(71) Applicant: Magnecomp Corporation, Murrieta, CA (US)

(72) Inventors: Kuen Chee Ee, Chino, CA (US); Long Zhang, Winchester, CA (US); David Glaess, Bangkok (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/879,657

(22) PCT Filed: Jun. 27, 2023

(86) PCT No.: PCT/US2023/026383
§ 371 (c)(1),
(2) Date: Dec. 27, 2024

(87) PCT Pub. No.: WO2024/010721
PCT Pub. Date: Jan. 11, 2024

(65) Prior Publication Data
US 2025/0349315 A1      Nov. 13, 2025

Related U.S. Application Data

(60) Provisional application No. 63/359,166, filed on Jul. 7, 2022.

(51) Int. Cl.
*G11B 5/48*          (2006.01)
*G11B 5/55*          (2006.01)
*G11B 5/596*         (2006.01)

(52) U.S. Cl.
CPC .......... *G11B 5/4873* (2013.01); *G11B 5/4826* (2013.01); *G11B 5/4833* (2013.01); *G11B 5/5552* (2013.01); *G11B 5/596* (2013.01)

(58) Field of Classification Search
None
See application file for complete search history.

(56) References Cited

U.S. PATENT DOCUMENTS

| | | |
|---|---|---|
| 7,417,830 B1 | 8/2008 | Kulangara |
| 7,872,834 B1 | 1/2011 | Pokornowski et al. |

(Continued)

OTHER PUBLICATIONS

International Search Report and Written Opinion in International Application No. PCT/US2023/026383, mailed Oct. 6, 2023.

(Continued)

*Primary Examiner* — Craig A. Renner
(74) *Attorney, Agent, or Firm* — DLA Piper LLP (US)

(57) ABSTRACT

A suspension assembly includes a load beam, a base plate connected to the load beam, and a single actuator disposed in an opening of the base plate. The single actuator is formed of a crystal material that expands along a first axis and contracts along a second orthogonal axis, and expands along the second axis and contracts along the first axis in response to respective first and second bias voltages. The single actuator is configured to flex the base plate when expanding along the first axis to rotate the load beam in a first rotational direction about a center of rotation located along the load beam, and flex the base plate when expanding along the second axis to rotate the load beam in a second, opposite rotational direction about the center of rotation.

8 Claims, 7 Drawing Sheets

(56)     References Cited

U.S. PATENT DOCUMENTS

| | | | | |
|---|---|---|---|---|
| 8,125,741 | B2 | 2/2012 | Shelor | |
| 9,286,923 | B2 | 3/2016 | Chua | |
| 12,094,504 | B1 * | 9/2024 | Atitallah et al. ..... | G11B 5/4873 |
| 2004/0261249 | A1 * | 12/2004 | Smith et al. .......... | B81C 99/002 |
| | | | | 29/559 |
| 2007/0109690 | A1 | 5/2007 | Yao et al. | |
| 2007/0223146 | A1 | 9/2007 | Yao et al. | |
| 2011/0085269 | A1 * | 4/2011 | Hanya et al. ........ | G11B 5/4873 |
| | | | | 360/244.2 |
| 2011/0141614 | A1 * | 6/2011 | Suzuki et al. ....... | G11B 5/4873 |
| | | | | 360/254 |
| 2011/0149439 | A1 | 6/2011 | Emley | |
| 2013/0314821 | A1 * | 11/2013 | Arai .................... | G11B 5/4873 |
| | | | | 360/244.5 |
| 2014/0346929 | A1 * | 11/2014 | Kim et al. ................ | B06B 1/14 |
| | | | | 310/329 |
| 2016/0154495 | A1 * | 6/2016 | Sha ....................... | G06F 3/0416 |
| | | | | 345/177 |

OTHER PUBLICATIONS

Preliminary Report on Patentability in International Application No. PCT/US2023/026383, mailed Jan. 16, 2025.

* cited by examiner

Actuator Arm Oscillations

— Conventional Dual PZT Actuators    - - - - - - Single Actuator

DISK DRIVE SUSPENSION ASSEMBLY WITH SINGLE ACTUATOR

CROSS-REFERENCE TO RELATED APPLICATIONS

This application is a United States National Stage Application filed under 35 U.S.C. § 371 of International Application No. PCT/2023/026383 filed Jun. 27, 2023, which claims the benefit of, and priority to, U.S. Provisional Application No. 63/359,166 filed on Jul. 7, 2022, which is hereby incorporated by reference in its entirety.

FIELD OF THE INVENTION

The present disclosure relates generally to suspensions for supporting read/write heads over recording media. In particular, the present disclosure relates to a head suspension assembly having a single actuator.

BACKGROUND OF THE INVENTION

Storage devices such as magnetic disk drive storage devices ("disk drives") store data on, and read data from, a spinning disk medium using a read/write head positioned over the surface of the spinning disk medium. A suspension assembly is used to position the read/write head over concentric tracks of the spinning disk medium. As an example, as shown in FIG. 1, a suspension assembly 2 can include a load beam 4 with a gimbal assembly 6 (containing a read/write head) mounted near the distal end of the load beam 4 that allows the read/write head to fly closely over the surface of the spinning disk medium during operation. The proximal end of the load beam 4 terminates in a hinge 8 that is connected to a base plate 10. The base plate 10 is connected to an actuator arm 12, which is connected to an actuator motor (not shown) that rotates the actuator arm, thus moving the entire suspension assembly 2 relative to the spinning disk medium. During operation, the actuator motor is used to position the read/write head over a desired concentric track of the spinning disk to write data to, or read data from, the desired concentric track.

As disk drive manufactures continue to develop smaller yet higher storage capacity drives, the density of the concentric tracks on the disk increases, making them narrower and more closely spaced. As track density increases, however, it becomes increasingly difficult for the actuator motor to quickly and accurately position the read/write head over the desired concentric track. Therefore, it has become known to use a pair of piezoelectric (PZT) actuators 14 and 16 mounted in an opening of the base plate 10 as shown in FIG. 2. A conventional PZT actuator is made of a material that expands in all directions in a plane when a forward bias voltage is applied (i.e., apply a voltage to a first terminal of the actuator that is positive relative to a voltage or ground at a second terminal of the actuator), and contracts when a reverse bias voltage is applied (i.e., apply a voltage to the first terminal that is negative relative to a voltage or ground at a second terminal). Therefore, the pair of PZT actuators expands and contracts in response to opposite polarity drive voltage signals. For example, a forward bias voltage is applied to PZT actuator 14 causing it to expand, while a reverse bias voltage is applied to PZT actuator 16 causing it to contract, which together cause the distal portion of the base plate 10 to flex so that load beam 4 rotates in a clockwise direction (about the distal end of the base plate 10) to implement fine control of the read/write head position.

To rotate the load beam 4 in a counterclockwise direction (about the distal end of the base plate 10), a reverse bias voltage is applied to PZT actuator 14 (causing it to contract) while a forward bias voltage is applied to PZT actuator 16 (causing it to expand). Thus, higher track positioning resolution can be achieved by complimenting the course positioning of the actuator motor with the fine positioning of the PZT actuators.

While the use of a pair of PZT actuators can provide better positioning resolution, this configuration adds complexity to the suspension assembly itself in terms of mounting multiple PZT actuators to the base plate. Further, it has been found that the driving of the pair of PZT actuators to rotate the load beam about an axis of rotation at the distal end of the base plate can excite an unwanted arm sway mode to occur, which are high frequency deflections that are induced in the actuator arm. For example, driving a pair of conventional PZT actuators has been shown to excite an arm sway mode at approximately 9.7 kHz.

There is a need for a simpler and more stable suspension assembly design to control fine tune positioning of the read/write head without exciting unwanted arm sway modes.

BRIEF SUMMARY OF THE INVENTION

The aforementioned problems and needs are addressed by an actuator for a disk drive and a suspension assembly that includes a load beam having a proximal end terminating in a hinge, a gimbal assembly mounted to the load beam, a base plate connected to the hinge and including an opening that defines first and second notches that face each other, and a single actuator disposed in the opening and mounted between the first and second notches, wherein the single actuator is formed of a crystal material that expands along a first axis of the single actuator and contracts along a second axis of the single actuator orthogonal to the first axis in response to a first bias voltage, and expands along the second axis and contracts along the first axis in response to a second bias voltage that is opposite in polarity to the first bias voltage. The single actuator is configured to flex the base plate when expanding along the first axis to rotate the load beam in a first rotational direction about a center of rotation located along the load beam, and flex the base plate when expanding along the second axis to rotate the load beam in a second rotational direction opposite the first rotational direction about the center of rotation.

Other objects and features of the present disclosure will become apparent by a review of the specification, claims and appended figures.

DETAILED DESCRIPTION OF THE INVENTION

Figures 1, 2:
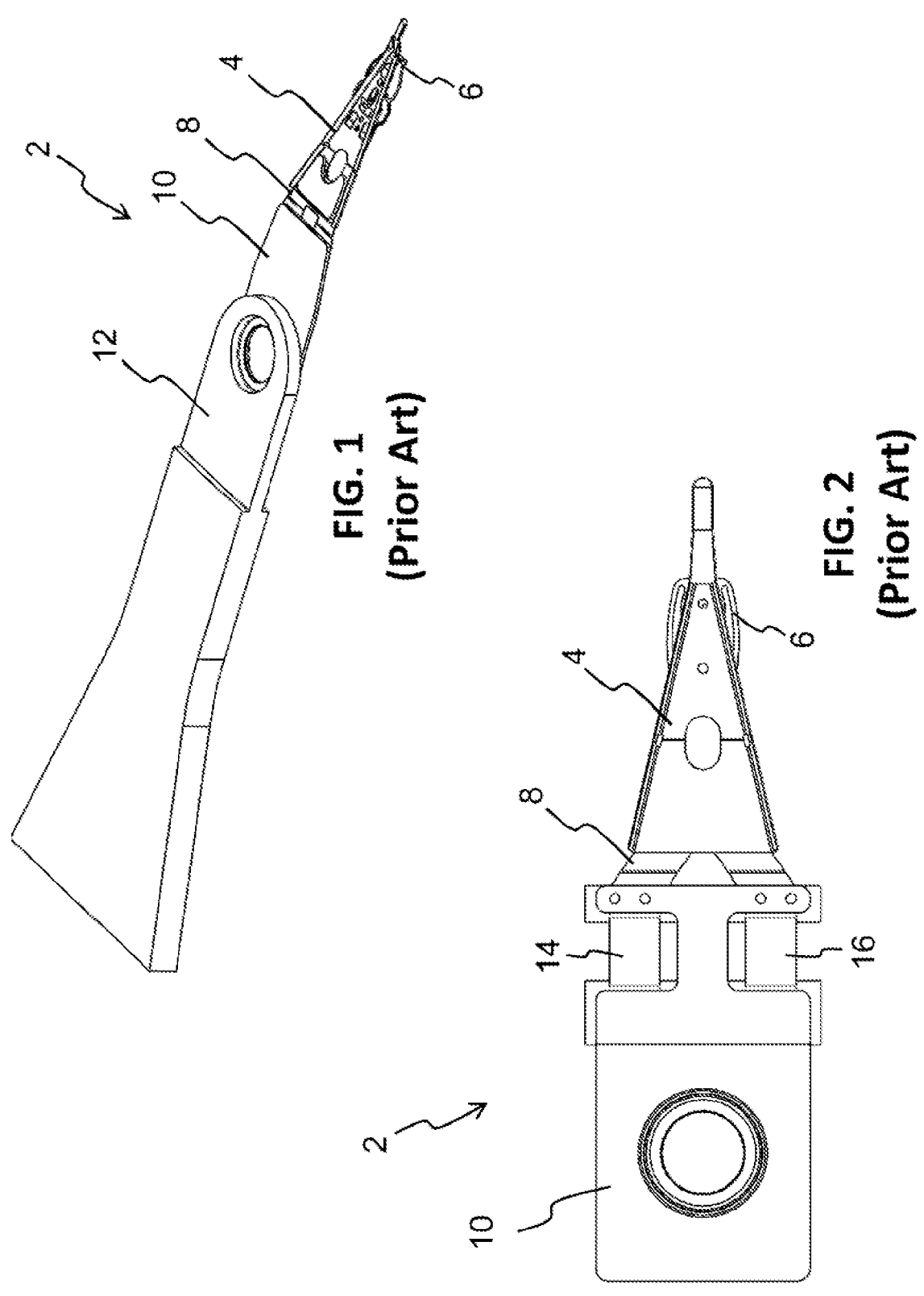
FIG. 1 is a perspective view of a conventional suspension assembly.
FIG. 2 is a top view of a conventional suspension assembly.
Figure 3:
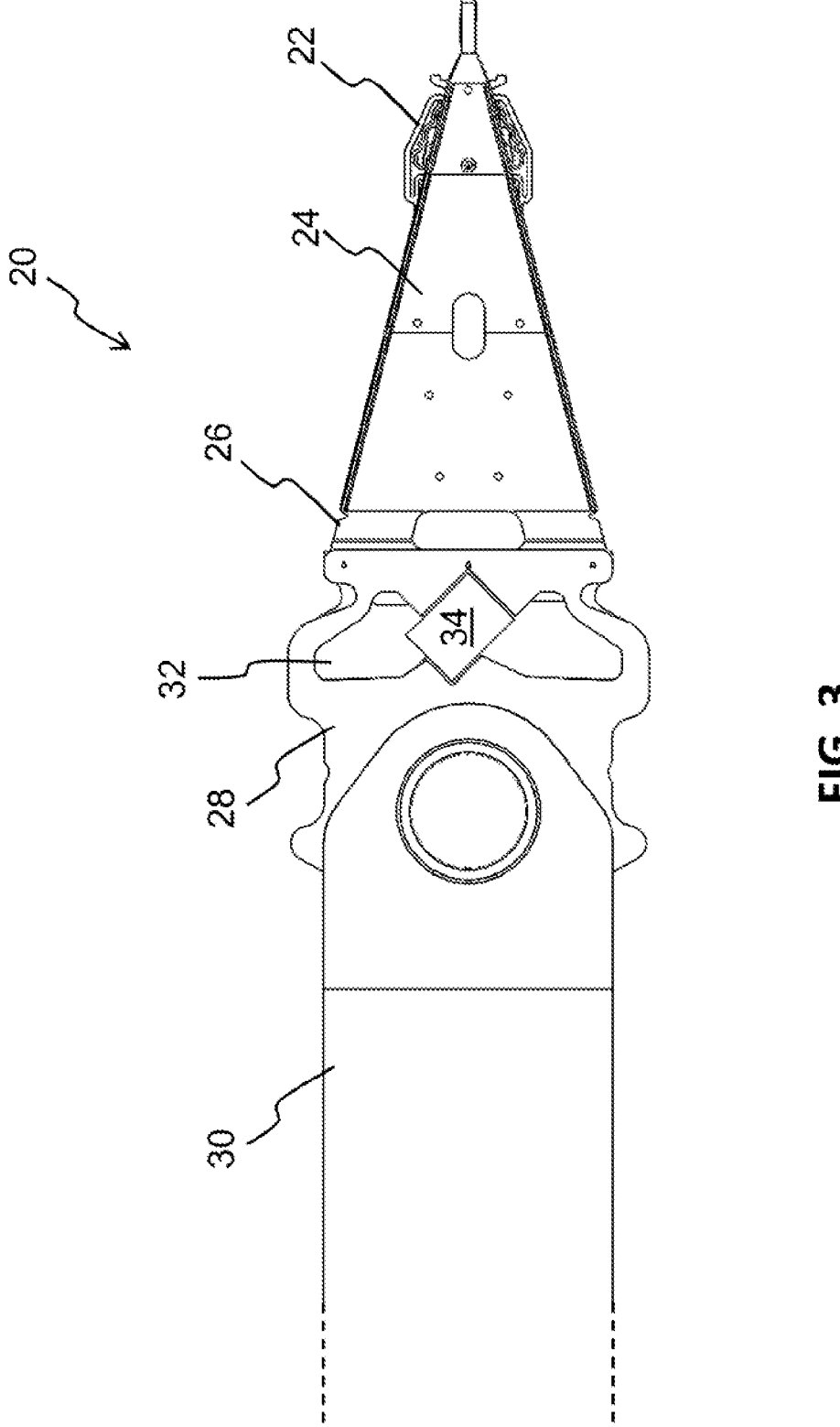
FIG. 3 is a top view of a suspension assembly according to the present disclosure.

The present disclosure is directed to a disk drive suspension assembly with a single actuator to provide fine control of the read/write head positioning. The suspension assembly 20 is shown in FIG. 3. A gimbal assembly 22 (containing a read/write head) is mounted near a distal end of a load beam 24. The proximal end of the load beam 24 terminates in a hinge 26 that is connected to the distal end of a base plate 28. The proximal end of the base plate 28 is connected to an actuator arm 30, which in turn is connected to an actuator motor (not shown) which used to move the suspension assembly 20 to position the read/write head of the gimbal assembly 22 over the desired concentric track on the surface of a spinning disk (not shown).

Figure 4:
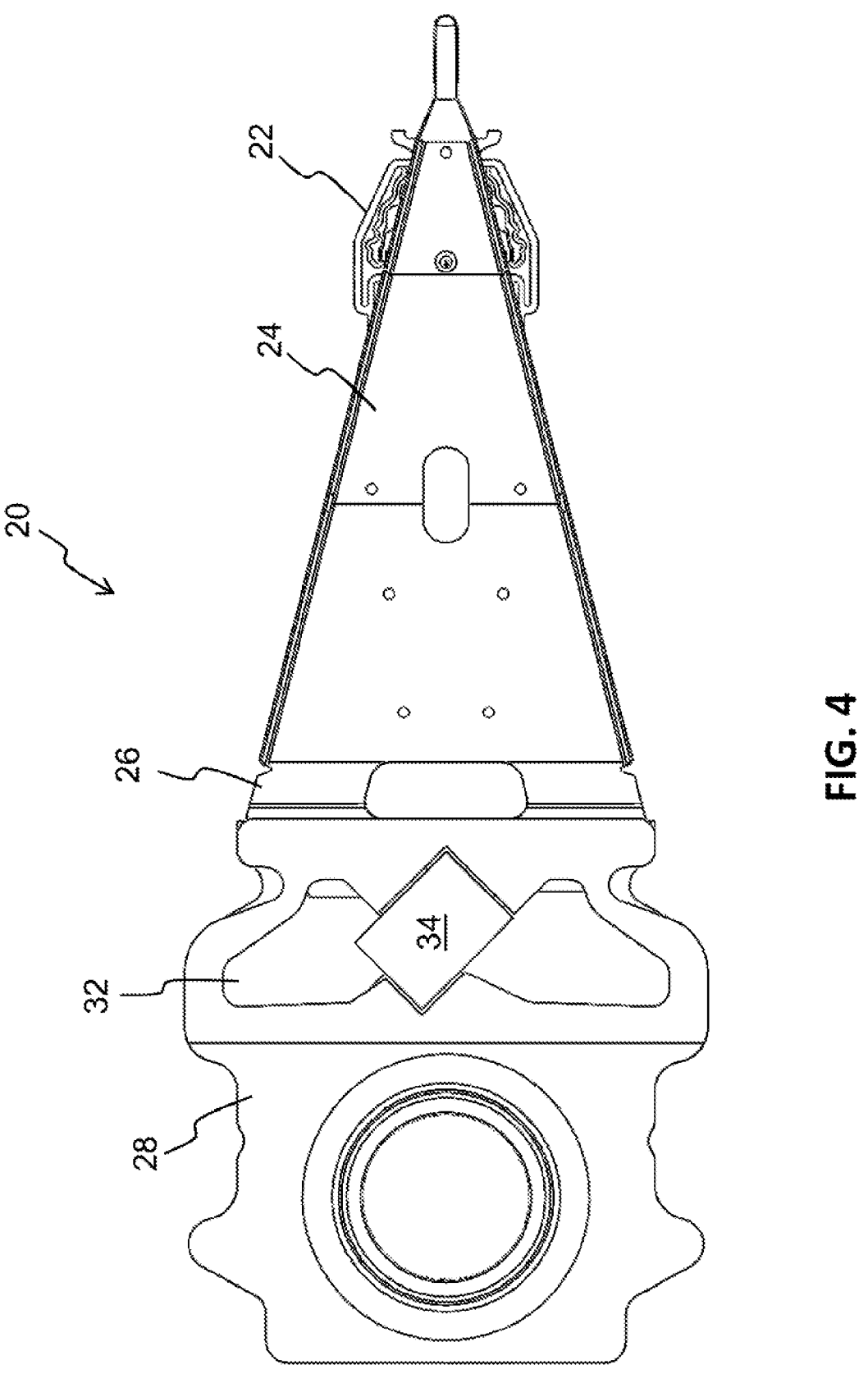
FIG. 4 is a top view of the suspension assembly according to the present disclosure.
Figure 5:
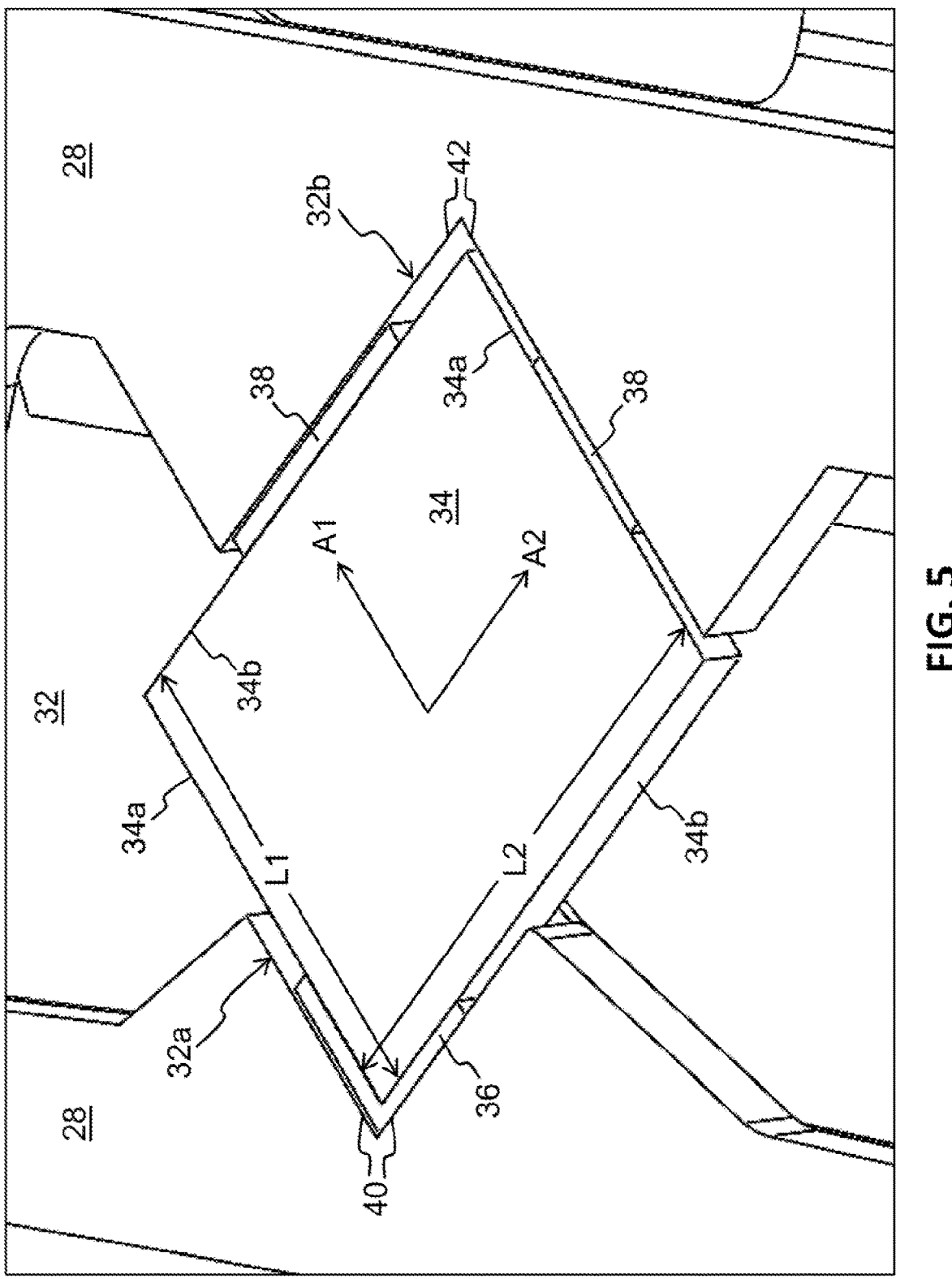
FIG. 5 is a top view of a portion of the suspension assembly according to the present disclosure.

As best shown in FIGS. 4-5, the distal end of the base plate 28 includes an opening 32 in which a single, rectangularly shaped actuator 34 is disposed and mounted. The actuator 34 has opposing sides 34a (e.g., first and second sides) and opposing sides 34b (e.g., third and fourth sides). The opening 32 defines first and second notches 32a/32b that face each other. A first corner of the actuator 34 is mounted in the first notch 32a by, for example, an adhesive 36, and a second, opposing corner of the actuator 34 is mounted in the second notch 32b by, for example, an adhesive 38. Notch 32a can have two substantially orthogonal mounting surfaces 40 (e.g. first and second mounting surfaces), each extending substantially parallel to the sides of the actuator 34 mounted to that mounting surface. Similarly, notch 32b can have two substantially orthogonal mounting surfaces 42 (e.g., third and fourth mounting surfaces), each extending substantially parallel to the sides of the actuator 34 mounted to that mounting surface. Therefore, the first and third sides are mounted to the first notch 32a, and the second and fourth sides are mounted to the second notch 32b. Further, the first mounting surface is mounted to a portion of the first side, the second mounting surface is mounted to a portion of the third side, the third mounting surface is mounted to a portion of the second side, and the fourth mounting surface is mounted to a portion of the fourth side. Given the nominal rectangular shape of actuator, the first mounting surface can be substantially orthogonal to the second mounting surface, and the third mounting surface can be substantially orthogonal to the fourth mounting surface.

The actuator 34 is formed of a crystal material with first and second orthogonal axes A1 and A2 aligned with opposing sides 34a and 34b respectively, where the crystal material responds to applied voltages in an anisotropic manner (i.e., the material expands along one of its axes while contracting along the other, and vice versa, depending upon the polarity of the bias voltage applied to the material). Specifically, the actuator 34 is configured such that when a first bias voltage (e.g., a forward or positive bias voltage) is applied to the actuator 34, the crystal material expands in response to the first bias voltage in the direction of the first axis A1 and contracts in the direction of the second axis A2. Conversely, when a second bias voltage opposite to the first bias voltage (e.g., a reverse or negative bias voltage) is applied to the actuator 34, the crystal material expands in response to the second bias voltage in the direction of the second axis A2 and contracts in the direction of the first axis A1. Crystal materials that can be used for actuator 34 include, but are not limited to, lead magnesium niobate-lead titanate (PMN-PT) and lead indium niobate-PMN-PT (PIN-PMN-PT). The in-plane anisotropic behavior is different than conventional PZT material in which the material expands in-plane in all directions (or contracts in-plane in all directions). In general, the crystal material also may have a much higher material constant (by 3 to 6 times) for expansion/contraction compared to conventional PZT material.

Crystal materials can exhibit different amounts of expansion for their respective axes A1 and A2 given comparable applied bias voltages of opposite polarity. For example, per unit length of the crystal material, the amount of expansion (referred to herein as per unit length expansion) in the first axis A1 can be greater than that for the second axis A2 given comparable but opposite polarity bias voltages. In that case, to make the total amounts of expansion in both axes closer in amplitude, the actuator can have a nominal length (i.e., a resting length when no voltage is applied to the material) in the direction of the first axis A1 that is less than a nominal length in the direction of the second axis A2. Accordingly, as best shown in FIG. 5, actuator 34 can be rectangular in shape, with opposing sides 34b having a nominal length L2 in the direction of second axis A2 that is greater than opposing sides 34a having a nominal length L1 in the direction of first axis A1, so that the overall relative expansion for the two axes A1 and A2 are comparable.

Figure 6:
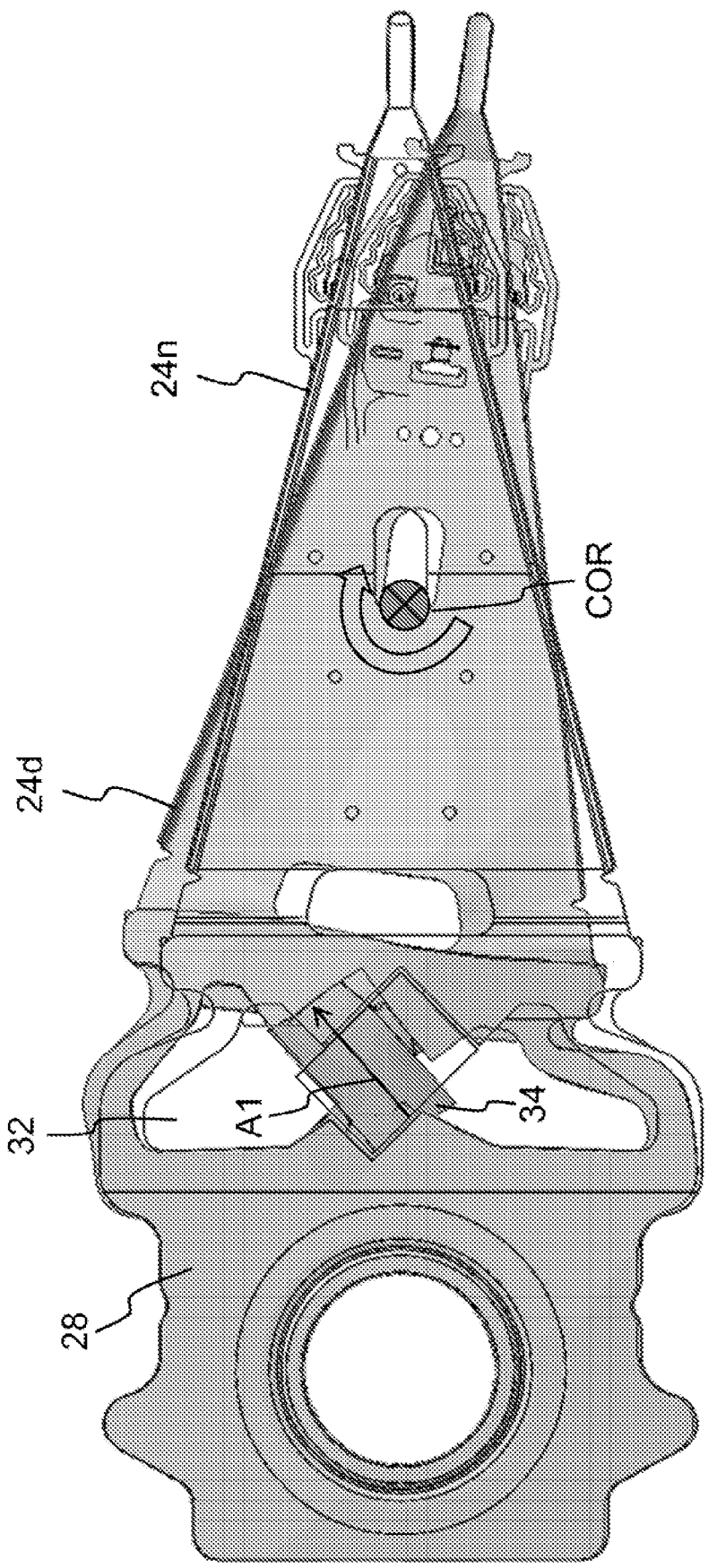
FIG. 6 is a top view of the suspension assembly according to the present disclosure, illustrating clockwise rotation of the load beam.

With the actuator 34 mounted in both notches 32a and 32b, both clockwise and counterclockwise rotations of the load beam 24 can be achieved using a single actuator. Specifically, applying a first bias voltage to actuator 34 causes the actuator to expand in the direction of first axis A1, and contract in the direction of the second axis A2, which flexes the distal end of base plate 28 so that it exhibits both rotational and translational deflection of the distal end of the base plate 28 and the load beam 24, as shown in FIG. 6 (the deflected position of the load beam 24d when the actuator 34 is activated by the first bias voltage is shown relative to the nominal position of the load beam 24n when the actuator is not activated by any bias voltage). Specifically, the flexed distal end of the base plate 28 causes the load beam 24 to rotate in a first rotational direction (e.g., clockwise) around a center of rotation COR located well within the load beam 24 (as opposed to at the distal end of the base plate 28). The center of rotation COR is located well within the load beam 24, between the gimbal assembly 22 and the hinge 26, because the distal end of the base plate 28 is both rotated and laterally displaced by the actuator 34.

Figure 7:
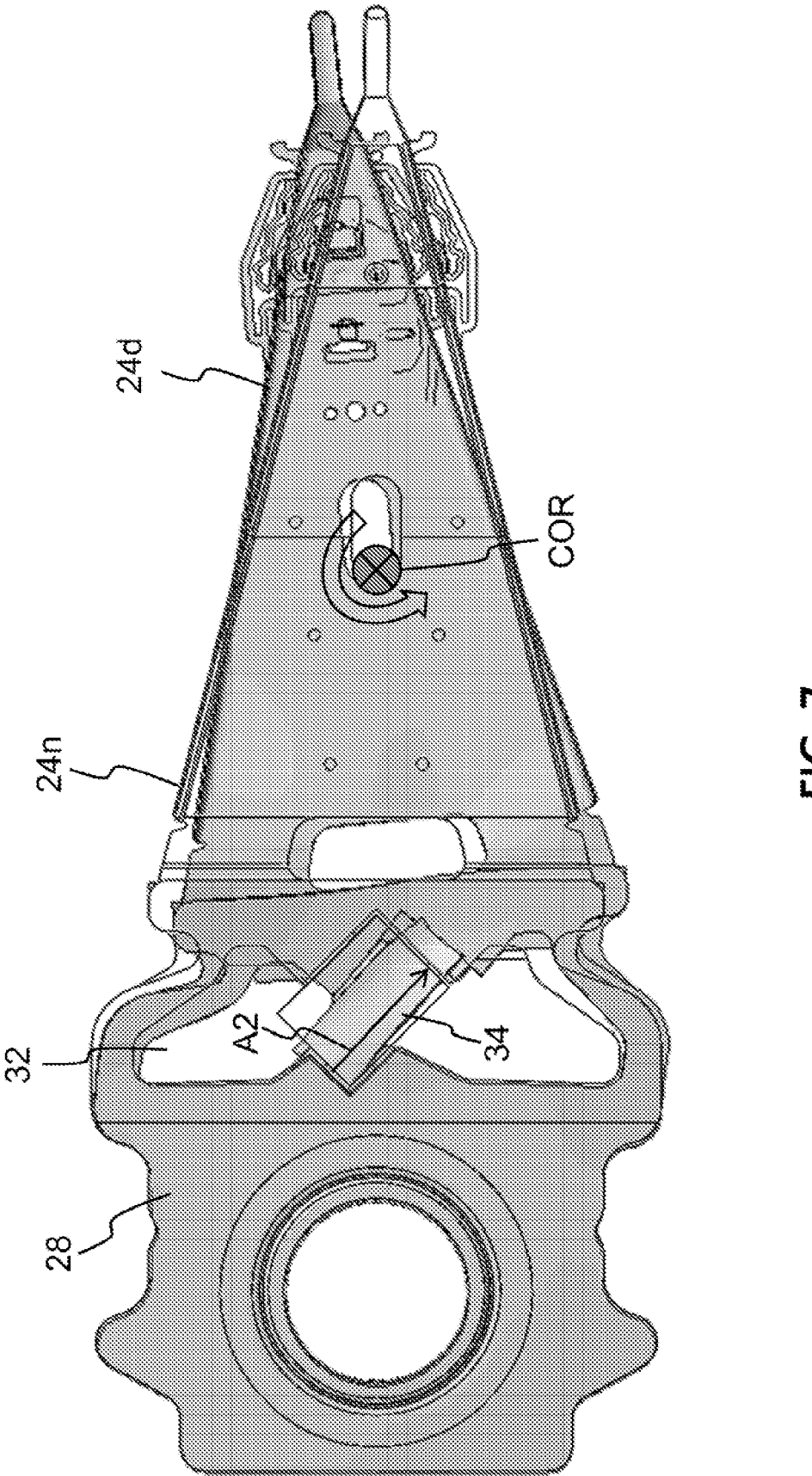
FIG. 7 is a top view of the suspension assembly according to the present disclosure, illustrating counterclockwise rotation of the load beam.

Conversely, applying a second bias voltage (of opposite polarity to the first bias voltage) to actuator 34 causes the actuator to expand in the direction of second axis A2, and contract in the direction of the first axis A1, which flexes the distal end of base plate 28 so that it exhibits both rotational and translational deflection of the distal end of the base plate 28 and the load beam 24, as shown in FIG. 7 (the deflected position of the load beam 24d when the actuator 34 is activated by the second bias voltage is shown relative to the nominal position of the load beam 24n when the actuator is not activated by any bias voltage). Specifically, the flexed distal end of the base plate 28 causes the load beam 24 to rotate in a second rotational direction (e.g., counterclockwise) opposite the first rotational direction (e.g., clockwise) around the center of rotation COR. Again, the center of rotation COR is located well within the load beam 24, between the gimbal assembly 22 and the hinge 26, because the distal end of the base plate 28 is both rotated and laterally displaced by the actuator 34.

Figure 8:
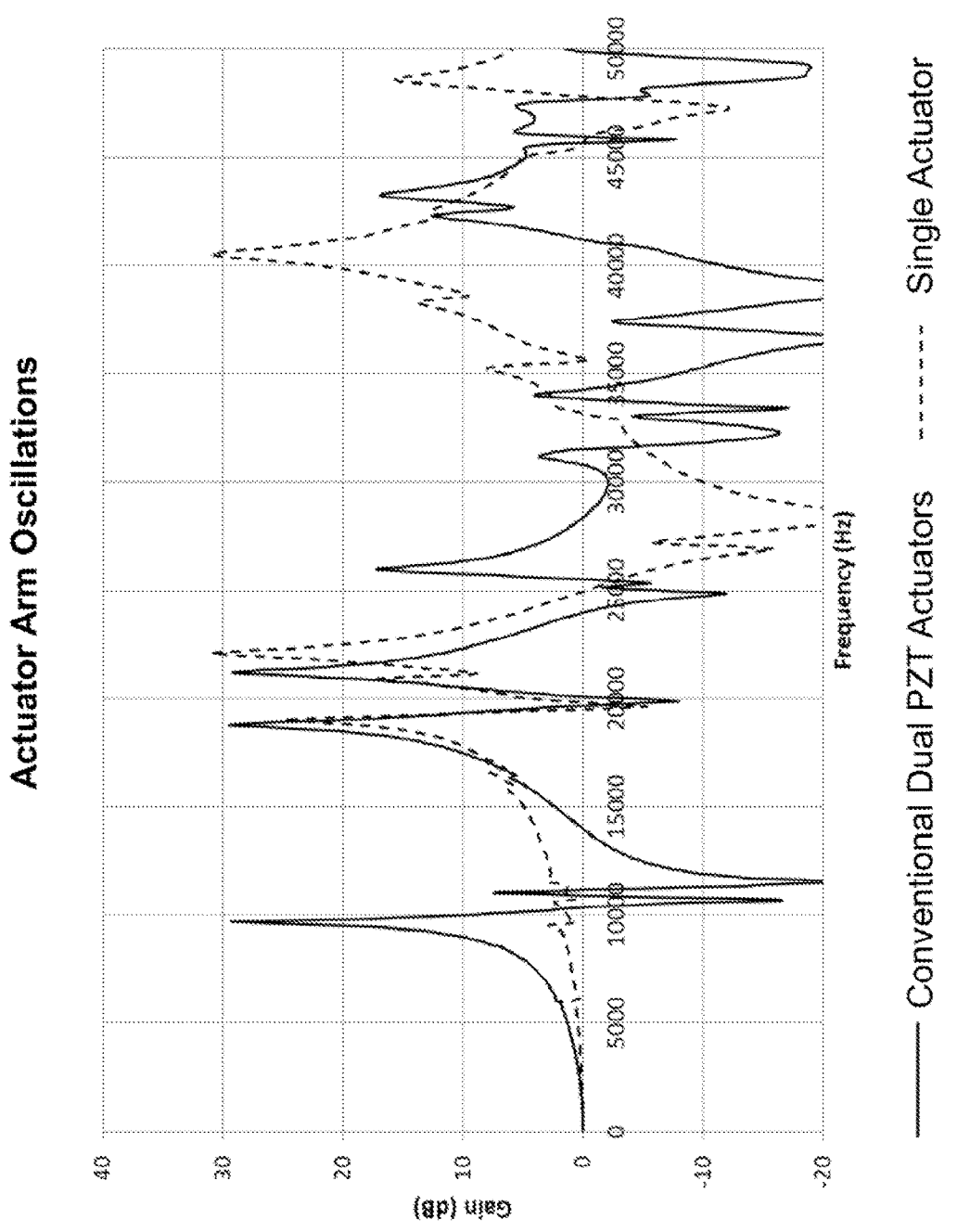
FIG. 8 is a graph showing actuator arm frequency response function for both a conventional suspension assembly and the suspension assembly of the present disclosure.

The configuration of suspension assembly 20 with a single actuator 34 has many advantages. First, the manufacturing of the suspension assembly is made simpler, with only a single actuator 34 and single set of drive voltage lines for implementing fine positioning control in both rotational directions of the load beam, instead of multiple PZT actuators and their associated drive voltage lines as previously done. Second, by moving the center of rotation away from the distal end of the base plate 28 and hinge 26, and into a more center portion of the load beam, the undesirable arm sway mode at the drive level (e.g., around 9.7 kHz) is significantly reduced, as shown in FIG. 8. The reduced arm sway mode improves the drive servo control performance as there is no need to apply a filter near the peak frequency to avoid unstable servo control.

It is to be understood that the present disclosure is not limited to the example(s) described above and illustrated herein, but encompasses any and all variations falling within the scope of any claims. For example, references to the present disclosure or invention or examples herein are not intended to limit the scope of any claim or claim term, but instead merely make reference to one or more features that may be covered by one or more claims. Materials, processes and numerical examples described above are exemplary only, and should not be deemed to limit the claims. The first bias voltage could be forward and positive, or could be reverse and negative, to generate either a clockwise rotation or a counterclockwise rotation of the load beam. Similarly, the second bias voltage would then be of opposite polarity of the first bias voltage, to generate an opposite direction rotation of the load beam.

What is claimed is:

1. A suspension assembly comprising:
a load beam having a proximal end terminating in a hinge;
a gimbal assembly mounted to the load beam;
a base plate connected to the hinge and including an opening that defines first and second notches that face each other; and
a single actuator disposed in the opening and mounted between the first and second notches, wherein the single actuator is formed of a crystal material that expands along a first axis of the single actuator and contracts along a second axis of the single actuator orthogonal to the first axis in response to a first bias voltage, and expands along the second axis and contracts along the first axis in response to a second bias voltage that is opposite in polarity to the first bias voltage;
wherein the single actuator is configured to:
flex the base plate when expanding along the first axis to rotate the load beam in a first rotational direction about a center of rotation located along the load beam, and
flex the base plate when expanding along the second axis to rotate the load beam in a second rotational direction opposite the first rotational direction about the center of rotation.

2. The suspension assembly of claim 1, wherein the crystal material has a nominal rectangular shape with opposing first and second sides extending substantially parallel to the first axis, and opposing third and fourth sides extending substantially parallel to the second axis.

3. The suspension assembly of claim 2, wherein the first and second sides have a first nominal length, and the third and fourth sides have a second nominal length.

4. The suspension assembly of claim 3, wherein the crystal material has a first per unit length expansion along the first axis that is greater than a second per unit length expansion along the second axis, and wherein the first nominal length is less than the second nominal length.

5. The suspension assembly of claim 2, wherein the first and third sides are mounted to the first notch, and the second and fourth sides are mounted to the second notch.

6. The suspension assembly of claim 5, wherein:
the first notch includes a first mounting surface mounted to a portion of the first side and a second mounting surface mounted to a portion of the third side, wherein the first mounting surface is substantially orthogonal to the second mounting surface; and
the second notch includes a third mounting surface mounted to a portion of the second side and a fourth mounting surface mounted to a portion of the fourth side, wherein the third mounting surface is substantially orthogonal to the fourth mounting surface.

7. The suspension assembly of claim 1, wherein the center of rotation is located between the gimbal assembly and the hinge.

8. The suspension assembly of claim 1, further comprising:
an actuator arm mounted to the base plate.

* * * * *